United States Patent
Anandan et al.

(10) Patent No.: US 6,219,462 B1
(45) Date of Patent: *Apr. 17, 2001

(54) METHOD AND APPARATUS FOR PERFORMING GLOBAL IMAGE ALIGNMENT USING ANY LOCAL MATCH MEASURE

(75) Inventors: Padmanabhan Anandan, Issaquah, WA (US); Michal Irani, Rehovot (IL)

(73) Assignee: Sarnoff Corporation, Princeton, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/070,170

(22) Filed: Apr. 30, 1998

Related U.S. Application Data

(60) Provisional application No. 60/046,069, filed on May 9, 1997.

(51) Int. Cl.⁷ ............................................... G06K 9/36
(52) U.S. Cl. ................................... 382/294; 382/278
(58) Field of Search .................................... 382/294, 295, 382/296, 297, 298, 299, 312, 277, 274, 276, 284, 287, 289, 151, 278; 348/47–51

(56) References Cited

U.S. PATENT DOCUMENTS

| | | | |
|---|---|---|---|
| 4,797,942 | 1/1989 | Burt | 382/41 |
| 5,202,928 * | 4/1993 | Tomita et al. | 381/1 |
| 5,220,614 | 6/1993 | Crain | 382/1 |
| 5,259,040 | 11/1993 | Hanna | 382/41 |
| 5,488,674 * | 1/1996 | Burt et al. | 382/284 |
| 5,557,684 | 9/1996 | Wang et al. | 382/107 |
| 5,611,000 * | 3/1997 | Szeliski et al. | 382/294 |
| 5,629,988 * | 5/1997 | Burt et al. | 382/276 |
| 5,872,630 * | 2/1999 | Johs et al. | 356/369 |

OTHER PUBLICATIONS

K.J. Hanna, "Direct multi–resolution estimation of ego–motion and structure from motion", Proceedings of IEEE Workshop on Visual Motion, Princeton, NJ, Oct. 7–9, 1991.

J. Bergen, P. Anandan, K. Hanna, R. Hingorani, "Hierarchical Model–Based Motion Estimation", Proc. of European Conference on Computer Vision–92, Mar. 23, 1992.

* cited by examiner

Primary Examiner—Jose L. Couso
Assistant Examiner—Kanji Patel
(74) Attorney, Agent, or Firm—William J. Burke; John V. Silverio

(57) ABSTRACT

A method for performing parametric image alignment, which when given any local match-measure, applies global estimation directly to the local match-measure data, without first going through an intermediate step of local flow estimation. The method can utilize any local match-measure, such as, correlation, normalized-correlation, squared or absolute brightness differences, statistical measures such as mutual information, and the like.

27 Claims, 3 Drawing Sheets

METHOD AND APPARATUS FOR PERFORMING GLOBAL IMAGE ALIGNMENT USING ANY LOCAL MATCH MEASURE

This application claims benefit of U.S. provisional patent application Ser. No. 60/046,069, filed May 9, 1997 and incorporated herein by reference.

The present invention generally relates to image processing systems and, more particularly, to a method and apparatus for aligning images within a image processing system.

BACKGROUND OF THE DISCLOSURE

In many image processing systems it is necessary that images be aligned with one another to perform image merging or analysis. The phrase image processing, as used herein, is intended to encompass the processing of all forms of images including temporally unrelated images as well as images (frames) of a video signal, i.e., a sequence of temporally related images. Image alignment in an image processing system is necessary to create mosaics of multiple images, perform some forms of image compression, perform motion estimation and/or tracking and the like. Alignment (also known as registration) of images begins with determining a displacement field that represents the offset between the images and then warping one image to the other to remove or minimize the offset. The images may be taken from the same sensor or from two entirely different sensors, possibly of different modality (e.g., an infrared sensor and a visible sensor). Often, the displacement field that defines the offset between the images can be described as a global parametric transformation between the two images, such as an affine, quadratic, or a projective transformation. Many techniques have been developed for the parametric transformation of a pair of images.

Most flow-based techniques divide the registration process into two steps: first a flow-field is estimated, then, using regression, the global parametric transformation which best describes the flow field is found. However, often the local flow estimates are noisy and unreliable, resulting in poor registration accuracy and a lack of robustness.

To overcome this problem, direct gradient-based techniques have been developed. These techniques estimate the global transformation parameters by directly using local image intensity information without first computing a local flow-field. They achieve high registration accuracy since they avoid the noisy step of computing a local flow-estimation. However, these techniques assume that the intensity values of corresponding pixels in the two images are the same, which is known as the "brightness constancy assumption". As a result, the applicability of direct gradient-based techniques is limited to situations when the images to be registered are substantially similar in appearance. Consequently, the direct gradient-based techniques cannot handle large changes in illumination and contrast between the images. Because the images need to be substantially similar to be registered using direct gradient-based techniques, images produced by sensors having different modality and/or containing a substantial range of motion cannot be accurately registered by direct gradient-based techniques.

Therefore, a need exists in the art for a method and apparatus that aligns images having substantial illumination differences between the images and/or a substantial amount of motion and/or other image differences that would otherwise make registration difficult.

SUMMARY OF THE INVENTION

The disadvantages of the prior art are overcome by the present invention of a method, which when given any local match measure, applies global estimation directly to the local match measure data, without first performing an intermediate step of local flow estimation. Any local match measure can be used as part of the inventive method, such as correlation, normalized-correlation, squared or absolute brightness difference, statistical measures such as mutual information, and the like. Global estimation constrains the analysis of the local match measure, thereby avoiding noisy local motion estimates, while still providing an accurate result for image registration.

In one embodiment of the invention, the inventive generalized global alignment method is used with a normalized-correlation match-measure to result in a global correlation-based alignment method which combines the robustness and accuracy of global alignment with the broad applicability of the normalized-correlation match measure. The inventive method overcomes many of the limitations of existing gradient-based and flow-based techniques. In particular, the novel method can handle large appearance differences between the images and large image motion within the image scene. Also, in contrast to the flow-based methods, the invention accurately registers imagery with sparse texture or feature content.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
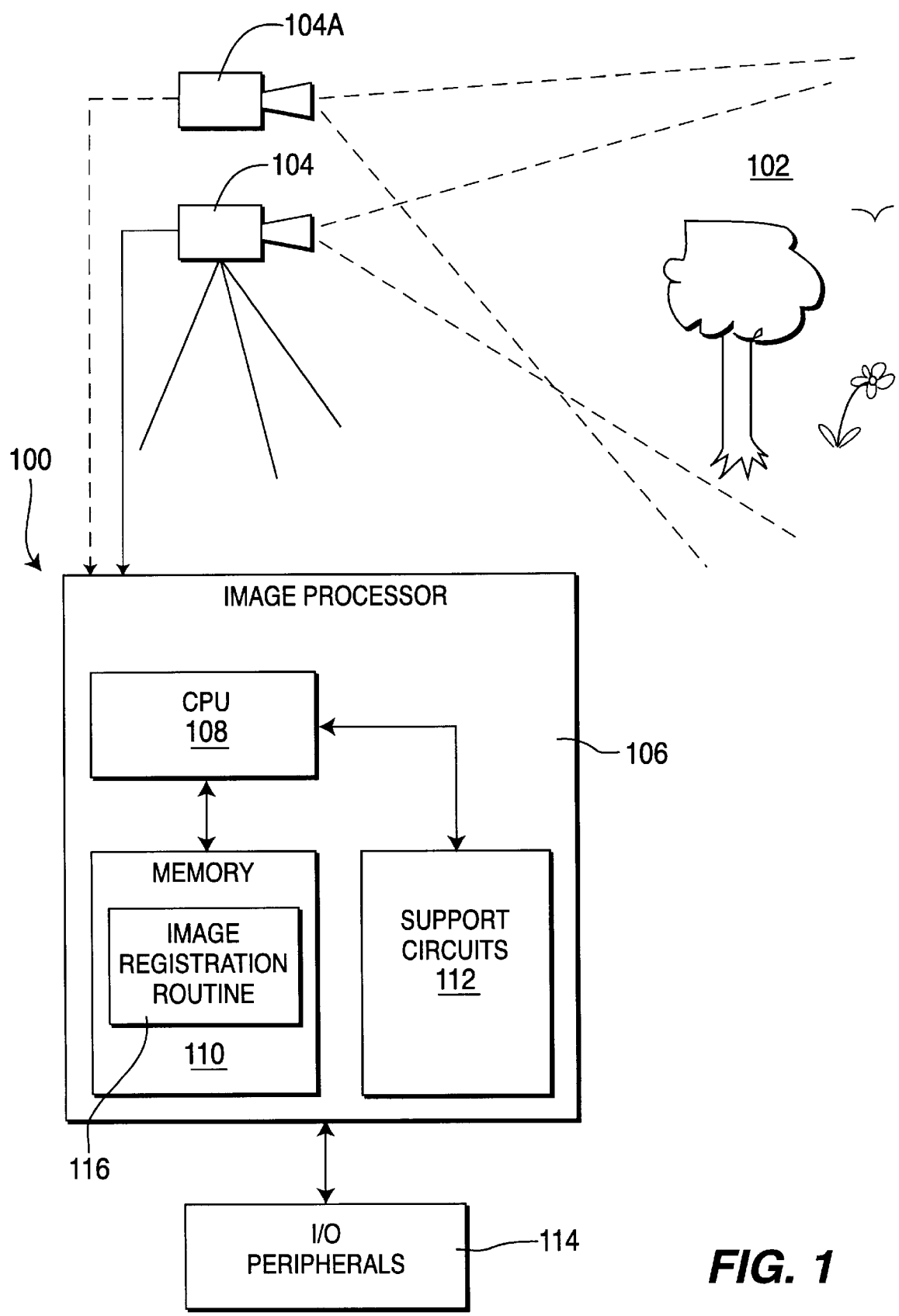
FIG. 1 depicts a block diagram of an image processing system of the present invention.

FIG. 1 depicts a block diagram of an image processing system 100 comprising at least one image sensor 104 and an image processor 106. The present invention can be used to process images produced by multiple sensors (e.g., sensor 104 and 104A) and is especially useful in processing images that are produced by sensors having different modalities, e.g., an infrared wavelength sensor 104A and a visible wavelength sensor 104. The sensors 104 and 104A are intended to provide imagery of a three dimensional scene 102.

To process these images, the image processor 106 comprises a central processing unit (CPU) 108, a memory device 110, conventional CPU support circuits 112 and input/output (I/O) peripherals 114. The CPU 108 is a general purpose computer that, when executing specific routines that are recalled form memory 110, becomes a specific purpose computer. The CPU can be any high-performance processor such as a PENTIUM II processor manufactured by Intel Corporation or a POWER PC processor manufactured by Motorola Inc. The memory 110 can be random access memory (RAM), read only memory (ROM), a hard disk drive, a floppy disk drive or any combination thereof. The support circuits 112 include various conventional circuits such as frame grabber circuits, analog-to-digital (A/D) circuits, clock circuits, cache, power supplies, and the like. The I/O peripherals 114 generally include a keyboard, a mouse, and a display, but may also include a video tape recorder, a video disk player, and the like. The images that are processed by the image processor 106 may not be sourced by the sensors 104, but may also be sourced from pre-recorded material such as would be provided by a video tape recorder or other image storage device.

The present invention is a routine 116 that, when executed by the CPU 108, provides a method, which when given any local match measure, applies global estimation directly to the local match measure data, without first performing an intermediate step of local flow estimation. Any local match measure can be used as part of the inventive method, such as correlation, normalized-correlation, squared or absolute brightness difference, statistical measures such as mutual information, and the like. Global estimation constrains the analysis of the local match measure, thereby avoiding noisy local motion estimates, while still providing an accurate result for image registration.

More specifically, when a pair of images representing a three dimensional scene 102 are to be aligned and merged, i.e., the images are to be registered, the induced image motion between two images depends on the cameras' internal parameters such as zoom and external parameters such as actual camera motion, as well as parallax motion within the 3D scene structure. In many practical situations, the induced motion field between the image pair can be modeled in terms of one or a small number of parametric transformations. Such transformations are well known in the art as represented in J. R. Bergen et al., "Hierarchical Model-based Motion Estimation," European Conference on Computer Vision, pp. 237–252, Santa Margarita Ligure, May 1992. The present invention expands upon this parametric transformation model by using a two-dimensional parametric transformation technique, although the approach generalizes to other classes of models as well.

Specifically, when the motion field is a linear function of a few unknown parameters $\{p_i\}$, then the motion vector $\vec{u}(x,y) = (u(x,y), v(x,y))^T$ can be expressed as:

$$\vec{u}(x, y; \vec{p}) = X(x,y) \cdot \vec{p} \quad (1)$$

where $X(x,y)$ is a matrix which depends only on the pixel coordinates $(x,y)$, and $\vec{p} = (p_1, \ldots, p_n)^T$ is the parameter vector. For example, for an affine transformation:

$$\begin{bmatrix} u(x, y; \vec{p}) \\ v(x, y; \vec{p}) \end{bmatrix} = \begin{bmatrix} p_1 + p_2 x + p_3 y \\ p_4 + p_5 x + p_6 y \end{bmatrix}$$

therefore, in this case: $\vec{p} = (p_1, p_2, p_3, p_4, p_5, p_6)^T$ and $$X = \begin{bmatrix} 1 & x & y & 0 & 0 & 0 \\ 0 & 0 & 0 & 1 & x & y \end{bmatrix}$$

and for a quadratic transformation:

$$\begin{bmatrix} u(x, y; \vec{p}) \\ v(x, y; \vec{p}) \end{bmatrix} = \begin{bmatrix} p_1 + p_2 x + p_3 y + p_7 x^2 + p_8 xy \\ p_4 + p_5 x + p_6 y + p_7 xy + p_8 x^2 \end{bmatrix}$$

therefore: $\vec{p} = (P_1, P_2, P_3, P_4, P_5, P_6, P_7, P_8)^T$ and $$X = \begin{bmatrix} 1 & x & y & 0 & 0 & 0 & x^2 & xy \\ 0 & 0 & 0 & 1 & x & y & xy & y^2 \end{bmatrix}$$

Given two images f and g, the local match measure $m(u,v;x,y)$ computes the similarity (or dissimilarity) between the pixels $f(x,y)$ and $g(x+u, y+v)$. Some of the common match measures used in existing registration techniques include: (i) correlation, (ii) normalized-correlation, which is generally preferred over regular correlation, since it is invariant to local changes in mean and contrast, (iii) squared brightness differences, which is applicable under the brightness constancy assumption, (iv) sum of squared brightness differences (SSD), and (v) mutual information which measures the statistical correlation between the two signals.

The present invention performs parametric registration of two images, f and g, by determining a parametric transformation $\vec{p}$ that maximizes (or minimizes) a global match-measure $M(\vec{p})$:

$$M(\vec{p}) = \sum_{x,y} m(u(x, y; \vec{p}), v(x, y; \vec{p}); x, y) \quad (2)$$

where $(u(x,y; \vec{p}), v(x,y; \vec{p}))$ is the motion field described by the parametric transformation $\vec{p}$, and $m(u,v;x,y)$ measures the local match between pixel $(x,y)$ in f and pixel $(x+u, y+v)$ in g. For example, when a correlation match-measure is used, then:

$$m(u, v; x, y) \stackrel{def}{=} \sum_{(i,j) \in W} f(x + i, y + j) g(x + u + i, y + v + j);$$

when a squared-brightness-difference measure is used, then:

$$m(u, v; x, y) \stackrel{def}{=} (f(x) - g(x + u, y + v))^2$$

The invention determines a global transformation $\vec{p}$ that maximizes (or minimizes) the sum of local match-measures m. The routine of the present invention estimates $\vec{p}$ via regression directly on surfaces of the local match-measure m, without first computing locally to specific image displacements $\{(u(x,y),v(x,y))\}$.

The inventive routine, first defines a match-measure surface: Let $S^{(x,y)}(u,v)$ denote a local match-measure surface corresponding to pixel $(x,y)$ in f. For any shift $(u,v)$ of g relative to f, $S^{(x,y)}$ is defined as:

$$S^{(x,y)}(u, v) \stackrel{def}{=} m(u, v; x, y)$$

For example, when the local match-measure $m(u,v;x,y)$ is derived using a correlation technique, then $S^{(x,y)}$ is the correlation surface of pixel (x,y). Equation (2) can therefore be rewritten in terms of the collection of surfaces $\{S^{(x,y)}\}$:

$$M(\vec{p}) = \sum_{(x,y)} S^{(x,y)}(u(x, y; \vec{p}), v(x, y; \vec{p})) \quad (3)$$

$$= \sum_{(x,y)} S^{(x,y)}(\vec{u}(x, y; \vec{p}))$$

For compactness of notation, $\vec{u}$ denotes the two-dimensional vector (u,v). To solve for $\vec{p}$ that maximizes $M(\vec{p})$, the routine uses Newton's method, which is an iterative method. Let $\vec{p}_o$ denote the parametric transformation that was computed in the previous iteration step. A second order Taylor expansion of $M(\vec{p})$ around $\vec{p}_o$ yields:

$$M(\vec{p}) = M(\vec{p}_0) + (\nabla_{\vec{p}} M(\vec{p}_0))^T \vec{\delta}_p + \vec{\delta}_p^T H_M(\vec{p}_0) \vec{\delta}_p \quad (4)$$

where, $\vec{\delta}_p = \vec{p} - \vec{p}_o$ is the unknown refinement step of $\vec{p}_o$ that is to be solved for, $\nabla_p M$ denotes the gradient of M (i.e., first derivatives of M), and $H_M$ denotes the Hessian of M (i.e., second derivatives of M):

$$\nabla_p M(\vec{p}) \stackrel{def}{=} \left( \frac{\partial M}{\partial p_1}, \frac{\partial M}{\partial p_2}, \ldots, \frac{\partial M}{\partial p_n} \right)^T$$

In order to find the parametric transformation $\vec{p}$ that maximizes $M(\vec{p})$, the right-hand side of Equation (4) is differentiated with respect to $\vec{\delta}_p$ and set equal to zero: $0 = \nabla_p M(\vec{p}_0) + H_M(\vec{p}_0) \vec{\delta}_p$. Therefore:

$$\vec{\delta}_p = -(H_M(\vec{p}_0))^{-1} \cdot \nabla_p M(\vec{p}_0) \quad (5)$$

where $\vec{\delta}_p^*$ denotes $\vec{\delta}_p$ which maximizes the quadratic approximation of $M(\vec{p})$ around $\vec{p}_o$ (Equation (4)). Hence, given $\vec{p}_o$ from the previous iteration, the system estimates a refinement step $\vec{\delta}_p^*$ to obtain a better estimate $\vec{\delta}_p = \vec{p} - \vec{\delta}_p^*$. The new $\vec{p}$ is then used as an initial estimate $\vec{p}_o$ for the next iteration.

Expressing the right-hand-side of Equation 5 in terms of the measurable quantities $\{S^{(x,y)}\}$ $$\nabla_p M(\vec{p}) = \sum_{x,y} (\nabla_p S(\vec{u})) = \sum_{x,y} (X^T \cdot \nabla_u S(\vec{u})) \quad (6)$$

$$H_M(\vec{p}) = \sum_{x,y} (X^T \cdot H_S(\vec{u}) \cdot X)$$

When X is the matrix defined in Equation (1) (i.e., $\vec{u}(x,y; \vec{p}) = X(x,y) \cdot \vec{p}$); $\nabla_u S(\vec{u})$ is the gradient of $S^{(x,y)} \vec{u}(x,y; \vec{p})$, and $H_S$ is the Hessian of $S^{(x,y)} \vec{u}(x,y; \vec{p})$, then Equation 6 becomes:

$$\nabla_u S(\vec{u}) \stackrel{def}{=} \left( \frac{\partial S^{(x,y)}}{\partial u}, \frac{\partial S^{(x,y)}}{\partial v} \right)^T$$

$$H_S(\vec{u}) \stackrel{def}{=} \begin{bmatrix} \frac{\partial^2 S^{(x,y)}}{\partial u^2} & \frac{\partial^2 S^{(x,y)}}{\partial u \partial v} \\ \frac{\partial^2 S^{(x,y)}}{\partial u \partial v} & \frac{\partial^2 S^{(x,y)}}{\partial v^2} \end{bmatrix}$$

Substituting Equation (6) into Equation (5) provides an expression for the refinement step $\vec{\delta}_p^*$ in terms of the local match-measure surfaces $\{S^{(x,y)}\}$.

$$\vec{\delta}_p^* = -\left( \sum_{(x,y)} X^T \cdot H_S(\vec{u}_0) \cdot X \right)^{-1} \cdot \left( \sum_{(x,y)} X^T \cdot \nabla_u S(\vec{u}_0) \right) \quad (7)$$

where $\vec{u}_0 = \vec{u}(x,y; \vec{p}_0)$ is the displacement induced at pixel (x,y) by the estimated parametric transformation $\vec{p}_o$ at the previous iteration. The process represented by Equation (7) functions as follows: at each iteration, for each pixel (x,y), the local quadratic approximation of the pixel's match-measure surface $S^{(x,y)}(\vec{u})$ is computed around its previously estimated displacement $\vec{u}_0$. These local quadratic approximations are then used in Equation (7) to solve for the global parametric refinement $\vec{\delta}_p^*$ To account for large misalignments between the two images, the system performs multi-resolution coarse-to-fine estimation, e.g., as in J. R. Bergen et al., "Hierarchical Model-based Motion Estimation," European Conference on Computer Vision, pp. 237–252, Santa Margarita Ligure, May 1992. To facilitate a coarse-to-fine alignment process, a Gaussian (or a Laplacian) pyramid is constructed for each of the two images. Although Gaussian and/or Laplacian pyramids are generally used, other forms of image decomposition may be appropriate such as the use of wavelets and the like. As such, the regressive process described above is used at each level of the pyramids to accurately process the images.

Figure 2:
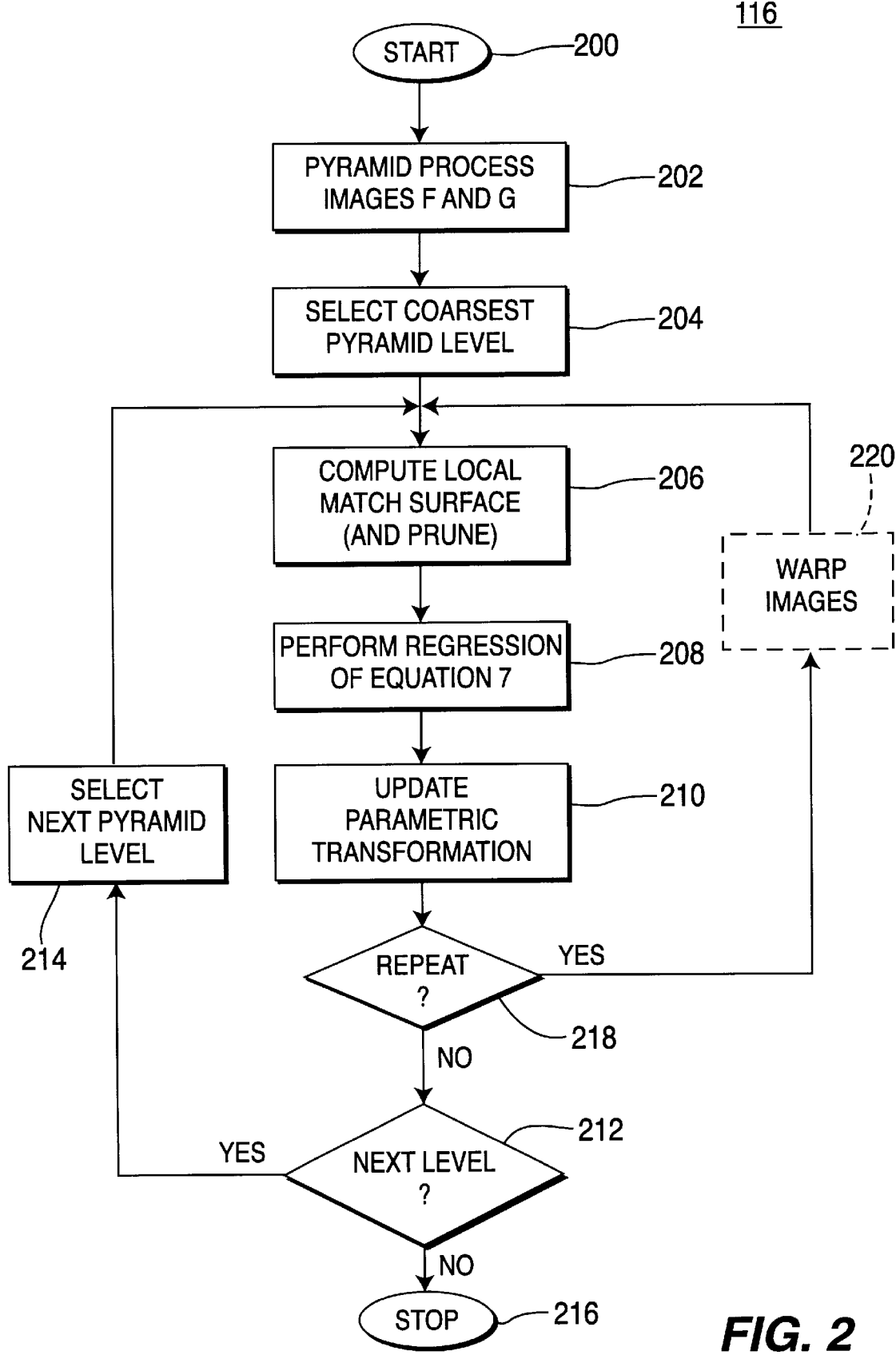
FIG. 2 depicts a flow diagram representing the method of the present invention.

FIG. 2 depicts a flow diagram of a routine 116 representing the method of the present invention as executed by the CPU of FIG. 1. The routine begins at step 200 and proceeds to step 202 where the pyramid processing is performed to decompose a pair of images f and g into a plurality of pyramid levels. Images f and g are supplied by one or more sensors, as described above, and digitally stored in memory as arrays of pixel values.

In the following description, $f_l$ and $g_l$ denote the images at resolution level l in the pyramids of images f and g, respectively. At step 204, the routine selects the coarsest level of the pyramids of each image. Starting at the selected coarsest resolution level with $\vec{p}_o$ initially set to 0, the following steps are performed at each resolution level of the pyramids.

At step 206, for each pixel (x,y) at $f_l$ compute a local match measure surface around $\vec{u}_o$ (i.e., around the displacement estimated at the previous iteration: $\vec{u}_0 = \vec{u}(x,y; \vec{p}_0) = X \vec{p}_0$). In practice, the match-measure surface is estimated only for displacements $\vec{u}$ of $g_l$ within a radius d around $\vec{u}_0$, i.e.:

$$S_l^{(x,y)}(\vec{u}) = m(u,v;x,y), \forall \vec{u} = (u,v) s.t. \|\vec{u} - \vec{v}_0\| \leq d$$

where the distance d of possible $\vec{u}$ from $\vec{u}_0$ is determined by the size of the masks used for discretely estimating the first and second order derivatives of $S^{(x,y)}(\vec{u})$ at $\vec{u}$. Although other masking functions can be used, in the present embodiment of the invention, Beaudet's masks were used to estimate the first and second order derivatives of the surfaces. Beaudet's masks are described in detail in Paul R. Beaudet, "Rotationally Invariant Image Operators," International Conference on Pattern Recognition, pp. 579–583 (1978). Satisfactory results have been found when using 3×3 masks (i.e., d=1) or with 5×5 masks (i.e., d=2).

At step 208, the routine performs the regression step of Equation. (7) to determine the parametric refinement $\vec{\delta}_p^*$.

At step 210, the parametric refinement is used to update $\vec{p}_o: \vec{p}_o := \vec{p}_o + \vec{\delta}_p^*$. To refine the computational accuracy, the routine returns to step 206. The loop represented by steps 206, 208 and 210 is repeated (step 218) until a predefined parametric transform accuracy is achieved for a given pyramid level. The predefined parametric transform accuracy varies from application to application and generally depends up the image resolution, the processing power of the computer performing the calculations, the complexity of the images being aligned and the like. After repeating the process loop of steps 206, 208, and 210 for a few iterations (typically four), the parameters $\vec{p}$ are propagated to the next resolution level, and the process is repeated at that resolution level.

The routine then queries, at step 212 whether another pyramid level is to be processed. If the query is affirmatively answered, the routine selects, at step 214, another level of the pyramid, e.g., the next finest level, and returns to step 208. Otherwise, the routine ends at step 216. The process is generally stopped when the iterative process at the highest resolution level is completed.

In practice, to improve performance, an image warping step 220 can be added before each iteration. An image warping process that would be useful in this step is disclosed in the Bergen et al. paper cited above. To implement image warping, the image g (an inspection image) is warped towards the image f (the reference image) according to the current estimated parametric transformation $\vec{p}_o$. After warping the images, $\vec{p}_o$ is again set to 0, and $\vec{\delta}_p^*$ is estimated between the two warped images. Warping compensates for the spatial distortions between the two images (e.g., scale difference, rotations, etc.), and hence improves the quality of the local match-measures which are generally based on a window around a pixel, such as in correlation.

To further condition the regression step of Equation (7) and make the process more robust, only pixels (x,y), where a quadratic approximation of $S^{(x,y)}(\vec{u})$ around $\vec{u}_0$ is concave, are used in the regression process, i.e., only concave surfaces are selected for use in the regression and all others are ignored. If $M(\vec{p})$ is minimized rather than maximized with respect to $\vec{p}$, then only convex (rather than concave) pixels are used. All other pixels are ignored. This automatic outlier rejection mechanism provides the routine with a strong locking property. The locking property occurs because of the well-known phenomenon that motion in the image that is close to the current global motion estimate influences the subsequent motion estimates more effectively than does motion estimates that are very far from the current estimate, i.e., the iterative technique "locks on" to the motion that is close to the estimate. In the present invention, this locking property is augmented by the active rejection of local match surfaces whose shape is inconsistent with the hypothesis that there is a local minimum of the error (or maximum of the match) in the neighborhood of the current estimate.

This selective use of the match surfaces can be extended such that the system selects only those local match surfaces that meet a specific criteria to be used in the regression process. As such, once all the match surfaces are computed in step 206 of FIG. 2, that step may optionally prune the number of match surfaces used in the regression process using criteria such as the gradient (slope) of the surface, the surface peak, the surface shape, and the like. Such selection will remove surfaces that are, for example, flat and prone to be noisy.

In a specific embodiment of the invention, the generalized process described above can be used with a normalized-correlation function as the local match-measure. The normalized-correlation function is represented as:

$$\frac{\sum (f(x+i, y+j) - \overline{f}_W) \cdot (g(x+u+i, y+v+j) - \overline{g}_W)}{\sqrt{(f(x+i, y+j) - \overline{f}_W)^2} \cdot \sqrt{(g(x+u+i, y+v+j) - \overline{g}_W)^2}}$$

where the summations are performed for (i,j)∈W, and $\overline{f}_W$ and $\overline{g}_W$ denote the mean brightness value within corresponding windows around pixel (x,y) in f and pixel (x+u,y+v) in g, respectively. Normalized correlation is widely applicable, since it is invariant to local changes in mean and contrast, i.e., when the images f and g are linearly related within the window W. Since the windows W are usually chosen to be small, global alignment based on local normalized correlation is invariant to a variety of non-linear global brightness variations between the two images f and g. The global correlation-based alignment process therefore combines the robustness and accuracy of global estimation with the broad applicability and large capture range of normalized correlation.

In the present embodiment of the invention, the normalized-correlation is estimated using 9×9 correlation windows applied to Laplacian pyramid images. The quadratic approximations are based on 3×3 Beaudet's masks (i.e., d=1). The global correlation-based alignment process of the present invention has been applied to many image pairs, consisting of a variety of types of scenes and motions including pairs of images containing actual image motion, external camera motion, and internal camera motion, e.g., camera zoom. The process of the present invention registered the images with superior results over the prior art flow field- and gradient-based registration techniques.

Due to the robust nature of the present invention, it can be used to register imagery produced by sensors of varying types, i.e., sensors having differing modalities such as an image from a visible camera and an image from an infrared camera. In an alternative embodiment of the invention, the global correlation-based alignment method presented above is applied to registering multi-sensor images. The adaptation of the present invention to multi-sensor images is based on a number of observations regarding multi-sensor imagery. First, when the images f and g are imaged by sensors of different modalities, the relationship between the brightness values of corresponding pixels is complex and unknown. Contrast reversal may occur in some parts of the images, while not in others. Furthermore, visual features present in one sensor image may not appear in the other image, and vice versa. Moreover, multiple brightness values in f may map to a single brightness value in g, and vice versa. In other words, the two multi-sensor images are usually not globally correlated, and often not even statistically correlated. Locally, however, (i.e., within small image patches), it is realistic to assume that the two images are correlated, up to a sign reversal.

Since a multi-resolution (coarse-to-fine) search is used in the present invention to handle large misalignments between the two images, it is important that the local match measure m(u,v;x,y) be applicable at all resolution levels (i.e., applicable to low-pass or band-pass filtered images). When the two images are obtained by the same sensor, or by two different cameras of same modality, then typically the corresponding signals at all resolution levels are correlated. In a multi-sensor image pair, however, the signals are correlated primarily in high resolution levels, where the details that correspond to the physical structure in the scene are captured. Low-pass filtered multi-sensor images are usually not correlated, as low resolution features depend heavily on the photometric and physical imaging properties of the sensors, which can differ substantially between the two images. To apply coarse-to-fine search to multi-sensor images, it is therefore necessary to project high-resolution scene information into low-resolution levels of the pyramid.

Figure 3:
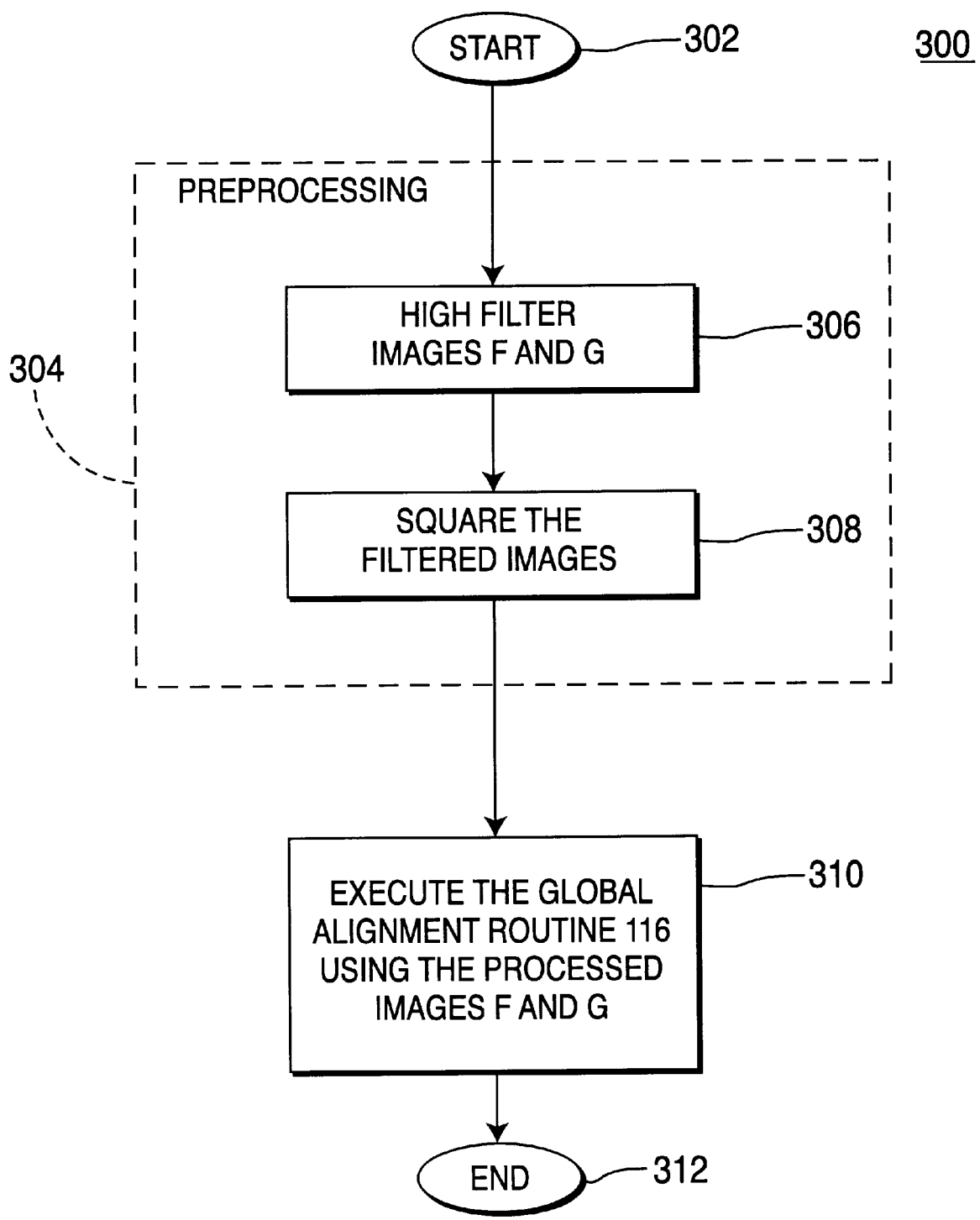
FIG. 3 depicts a flow diagram representing a second embodiment of the method of the present invention.

Consequently, these observations require the foregoing method of FIG. 2 to be slightly altered to produce a multi-sensor registration process. FIG. 3 depicts a block diagram of the multi-sensor registration routine 300. In routine 300, the images are pre-processed prior to being subjected to the global alignment routine 116 of FIG. 2. Specifically, the routine 300 begins at step 302 and proceeds to step 304 to accomplish image preprocessing. The images are pre-filtered to assure that when the pyramid is constructed, high-resolution information will in fact be projected into low resolution levels. In particular, in step 306, each of the two multi-sensor images is first high-pass filtered using a Laplacian filter, then, at step 306, the filtered images are squared. The squaring process assures that high resolution features appear in low resolution levels. Processing to achieve high resolution feature shifting is disclosed in P. J. Burt, "Smart Sensing With a Pyramid Vision Machine, Proceeding of the IEEE, 76:1006–1015 (1988). Since the Laplacian-energy image is invariant to contrast reversal in the original image, a local match measure based on normalized-correlation is adequate for this kind of imagery.

At step 310, the global alignment routine 116 of FIG. 2 is applied with a normalized-correlation local match measure to the Laplacian-energy images (the preprocessed images) rather than to the original images f and g.

Further increase in the sensitivity of the local match measure can be achieved by using directional-derivative energy images instead of the Laplacian-energy images. The global correlation-based registration was extended to apply simultaneously to a collection of n multi-sensor pairs of directional-derivative-energy images. The extension is performed by estimating a single parametric transformation $\vec{p}$, which simultaneously maximizes the local normalized-correlations of n image pairs:

$$M(\vec{p}) = \Sigma_{(x,y)} \Sigma_{i=1}^{n} S_i^{(x,y)}(u)(x,y;\vec{p}), v(x,y;\vec{p})) \quad (8)$$

where $S_i^{(x,y)}$ is the match-measure surface estimated for pixel (x,y) in the i-th image pair. In particular, this can be applied to n corresponding pairs of directional-derivative-energy images.

In practice, the invention has be used with four (n=4) directional derivatives (horizontal, vertical, and the two diagonals). Applying the global correlation-based alignment simultaneously to the 4 corresponding pairs provides the global alignment with increased robustness, which allows for successful multi-sensor registration even in very challenging situations, i.e., when there are significant differences in image content between the two sensor-images. Apart from having significantly different appearance, there can be many non-common features in the multi-sensor image pair, which can lead to false matches. These are overcome by the automatic outlier mechanism of the present invention.

Although various embodiments which incorporate the teachings of the present invention have been shown and described in detail herein, those skilled in the art can readily devise many other varied embodiments that still incorporate these teachings.

What is claimed is:

1. A method for aligning a first image with a second image comprising the steps of:
   determining a plurality of local match surfaces using a normalized correlation function, where each of said local match surfaces comprises a contoured surface associated with at least one pixel in said first image; and
   performing a global regression across the plurality of local match surfaces to achieve alignment of the images without generating a local flow estimation.

2. The method of claim 1 wherein said normalized correlation function is represented by:

$$\frac{\sum (f(x+i, y+j) - \overline{f}_W) \cdot (g(x+u+i, y+v+j) - \overline{g}_W)}{\sqrt{(f(x+i, y+j) - \overline{f}_W)^2} \cdot \sqrt{(g(x+u+i, y+v+j) - \overline{g}_W)^2}}$$

where the summations are performed for (i,j)∈W, and $\overline{f_W}$ and $\overline{g_W}$ denote the mean brightness value within corresponding windows around pixel (x,y) in image f and pixel (x+u,y+v) in image g, respectively.

3. The method of claim 1 wherein said global regression determines a parametric transformation that aligns the first and second images.

4. The method of claim 1 wherein said plurality of local match surfaces that are used to perform the global regression are less than the number of local match surfaces in the plurality of local match surfaces determined.

5. The method of claim 3 wherein a refinement step of said parametric transformation is computed as $$\vec{\delta}_p^* = -\left(\sum_{(x,y)} X^T \cdot H_S(\vec{u}_0) \cdot X\right)^{-1} \cdot \left(\sum_{(x,y)} X^T \cdot \nabla_u S(\vec{u}_0)\right)$$

where:

X is a matrix defined in $\vec{u}(x,y;\vec{p}) = X(x,y) \cdot \vec{p}$;

$\{S^{(x,y)}\}$ is a local match-measure surface at location (x,y);

$\nabla_u S(\vec{u})$ is a gradient of $S^{(x,y)} \vec{u}(x,y;\vec{p})$; and $H_S$ is a Hessian of $S^{(x,y)} \vec{u}(x,y;\vec{p})$,;

$\vec{u}_0 = \vec{u}(x,y;\vec{p}_0)$ is a displacement induced at pixel (x,y) by an estimated parametric transformation $\vec{p}_o$ during a previous iteration.

6. The method of claim 5 wherein said parametric transformation is iterated until the parametric transformation is deemed sufficient to align the first and second images.

7. The method of claim 6 wherein after each iteration the first and second images are warped into alignment using the parametric transformation determined during a previous iteration.

8. The method of claim 1 further comprising a step of pyramid processing each of said first and second images to decompose said first and second images into first and second image pyramids, where said global regression is performed on an image pyramid level by image pyramid level basis.

9. The method of claim 8 wherein said image pyramid level by image pyramid level is accomplish in a coarse to fine resolution sequence.

10. The method of claim 1 wherein said first and second images are produced by sensors having different modalities.

11. The method of claim 1 further comprising the steps of:
high pass filtering said first and second images; and
squaring the high pass filtered first and second images.

12. A method for aligning a first image with a second image comprising the steps of:
 (a) decomposing said first and second images respectively into first and second image pyramids;
 (b) selecting a pyramid level in each of said first and second image pyramids;
 (c) determining a plurality of local match surfaces within said selected pyramid level;
 (d) determining a parametric transformation that aligns the selected pyramid level of said first and second images using the following global regression expression $$\vec{\delta}_p^* = -\left(\sum_{(x,y)} X^T \cdot H_S(\vec{u}_0) \cdot X\right)^{-1} \cdot \left(\sum_{(x,y)} X^T \cdot \nabla_u S(\vec{u}_0)\right);$$

where:
X is a matrix defined in $\vec{u}(x,y;\vec{p})=X(x,y)\cdot\vec{p}$;
$\{S^{(x,y)}\}$ is a local match-measure surface at location (x,y);
$\nabla_u S(\vec{u})$ is a gradient of $S^{(x,y)}\vec{u}(x,y;\vec{p})$; and
$H_S$ is a Hessian of $S^{(x,y)}\vec{u}(x,y;\vec{p})$;
$\vec{u}_0 = \vec{u}(x,y;\vec{p}_0)$ is a displacement induced at pixel (x,y) by an estimated parametric transformation $\vec{p}_o$ during a previous iteration;
 (e) repeating steps (c) and (d) until said parametric transformation meets a predefined criterion;
 (f) repeating steps (b), (c), (d) and (e) until all said pyramid levels in said first and second image pyramids are aligned.

13. The method of claim 12 wherein each of the local match surfaces in the plurality of local match surface is determined using a function selected from one of the following functions: correlation, normalized correlation, and squared or absolute brightness difference.

14. The method of claim 12 wherein step (e) further comprising warping said first and second images into alignment using the parametric transformation and setting the parametric transformation to zero.

15. The method of claim 12 wherein said first and second images are produced by sensors having different modalities.

16. The method of claim 12 further comprising the steps of:
high pass filtering said first and second images; and
squaring the high pass filtered first and second images.

17. A digital storage medium containing a program that, when executed by a general purpose computer, causes the computer to align a first and second images using the steps of:

determining a plurality of local match surfaces using a normalized correlation function, where each of said local match surfaces comprises a contoured surface associated with at least one pixel in said first image; and performing a global regression across the plurality of local match surfaces to achieve alignment of the images without generating a local flow estimation.

18. The medium of claim 17 wherein the normalized correlation function is represented by:

$$\frac{\sum (f(x+i,y+j)-\overline{f}_W)\cdot(g(x+u+i,y+v+j)-\overline{g}_W)}{\sqrt{(f(x+i,y+j)-\overline{f}_W)^2}\cdot\sqrt{(g(x+u+i,y+v+j)-\overline{g}_W)^2}}$$

where the summations are performed for (i,j)∈W, and $\overline{f}_W$ and $\overline{g}_W$ denote the mean brightness value within corresponding windows around pixel (x,y) in image f and pixel (x+u,y+v) in image g, respectively.

19. The medium of claim 17 wherein said global regression determines a parametric transformation that aligns the first and second images.

20. The medium of claim 17 containing said program that causes said general purpose computer to determine a change in said parametric transformation by solving the expression $$\vec{\delta}_p^* = -\left(\sum_{(x,y)} X^T \cdot H_S(\vec{u}_0) \cdot X\right)^{-1} \cdot \left(\sum_{(x,y)} X^T \cdot \nabla_u S(\vec{u}_0)\right)$$

where:
X is a matrix defined in $\vec{u}(x,y;\vec{p})=X(x,y)\cdot\vec{p}$;
$\{S^{(x,y)}\}$ is a local match-measure surface at location (x,y);
$\nabla_u S(\vec{u})$ is a gradient of $S^{(x,y)}\vec{u}(x,y;\vec{p})$; and
$H_S$ is a Hessian of $S^{(x,y)}\vec{u}(x,y;\vec{p})$;
$\vec{u}_0 = \vec{u}(x,y;\vec{p}_0)$ is a displacement induced at pixel (x,y) by an estimated parametric transformation $\vec{p}_o$ during a previous iteration.

21. The medium of claim 17 further comprising the step of iterating said method until the parametric transformation is deemed sufficient to align the first and second images.

22. The medium of claim 21 further comprising the step of, after each iteration, warping the first and second images into alignment using the parametric transformation determined during a previous iteration.

23. The medium of claim 17 furher comprising a step of pyramid processing each of said first and second images to decompose said first and second images into first and second image pyramids, where said global regression is performed on an image pyramid level by image pyramid level basis.

24. The medium of claim 17 wherein said first and second images are produced by sensors having different modalities.

25. The medium of claim 17 further comprising the steps of:
high pass filtering said first and second images; and
squaring the high pass filtered first and second images.

26. The method of claim 1 wherein said normalized correlation function uses 9×9 pixel correlation windows.

27. The apparatus of claim 17 wherein said normalized correlation function uses 9×9 pixel correlation windows.

* * * * *